Aug. 23, 1949.   J. HARSCHEL   2,479,569
MECHANICAL CONVERTER
Filed Nov. 26, 1943   3 Sheets-Sheet 2
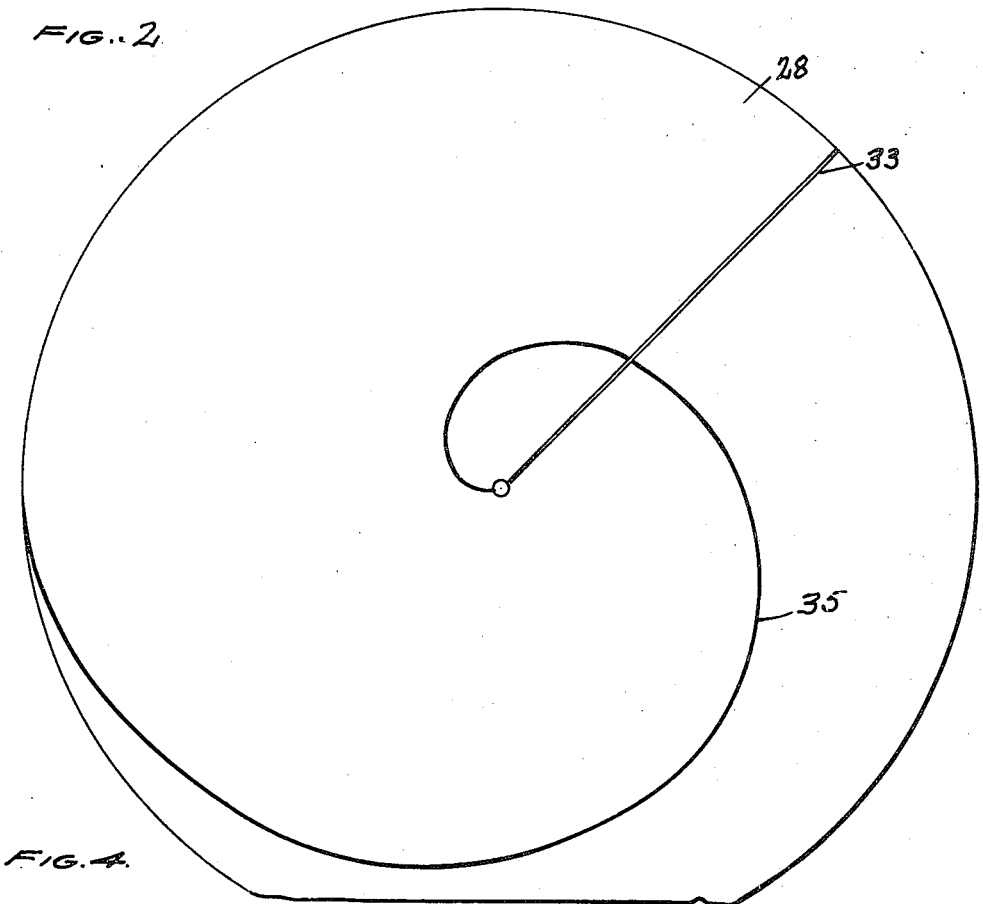
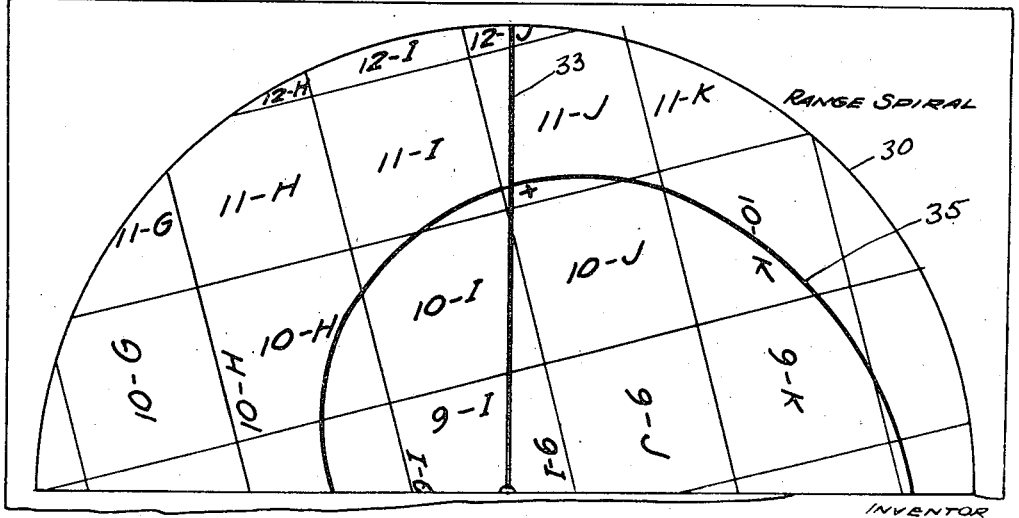
INVENTOR
JONAS HARSCHEL
ATTORNEY Aug. 23, 1949.                J. HARSCHEL                    2,479,569
                          MECHANICAL CONVERTER
Filed Nov. 26, 1943                                      3 Sheets-Sheet 3
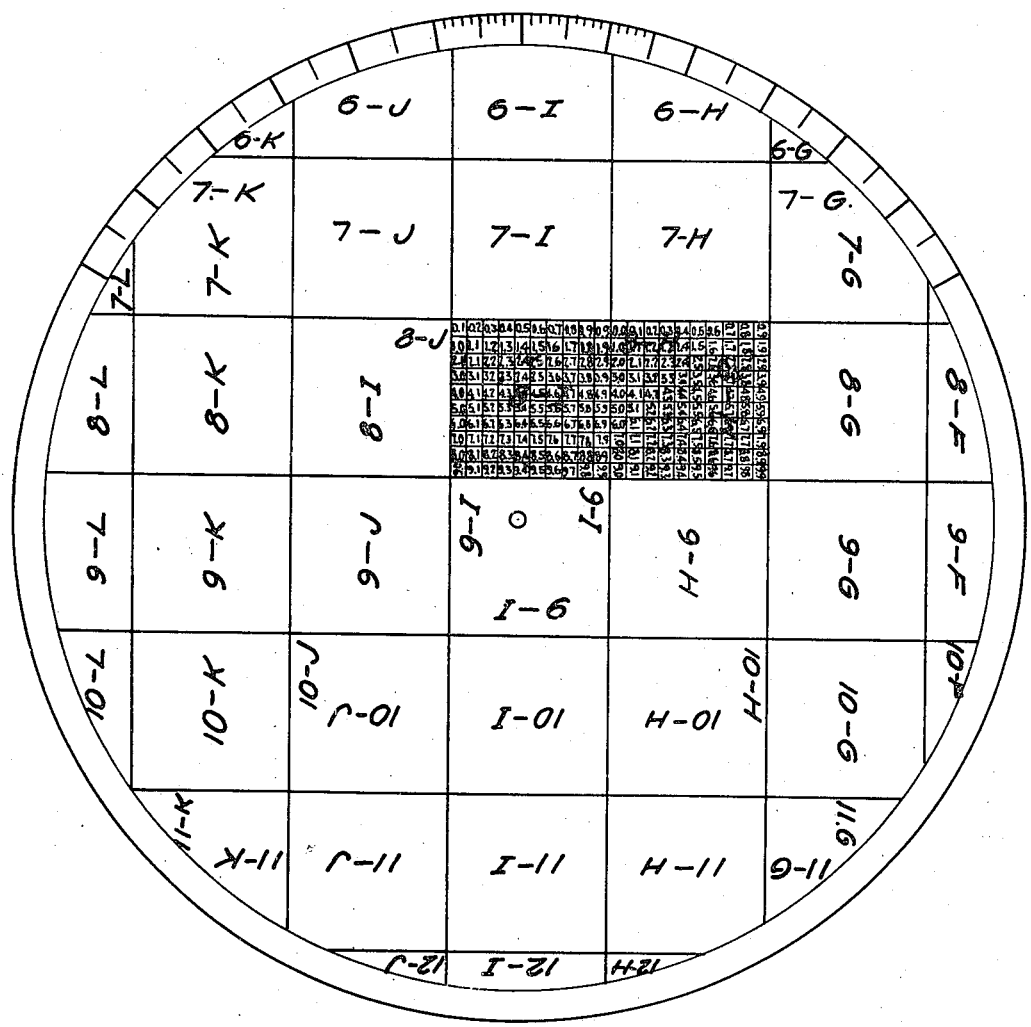
INVENTOR
JONAS HARSCHEL
BY William D. Hall
ATTORNEY Patented Aug. 23, 1949

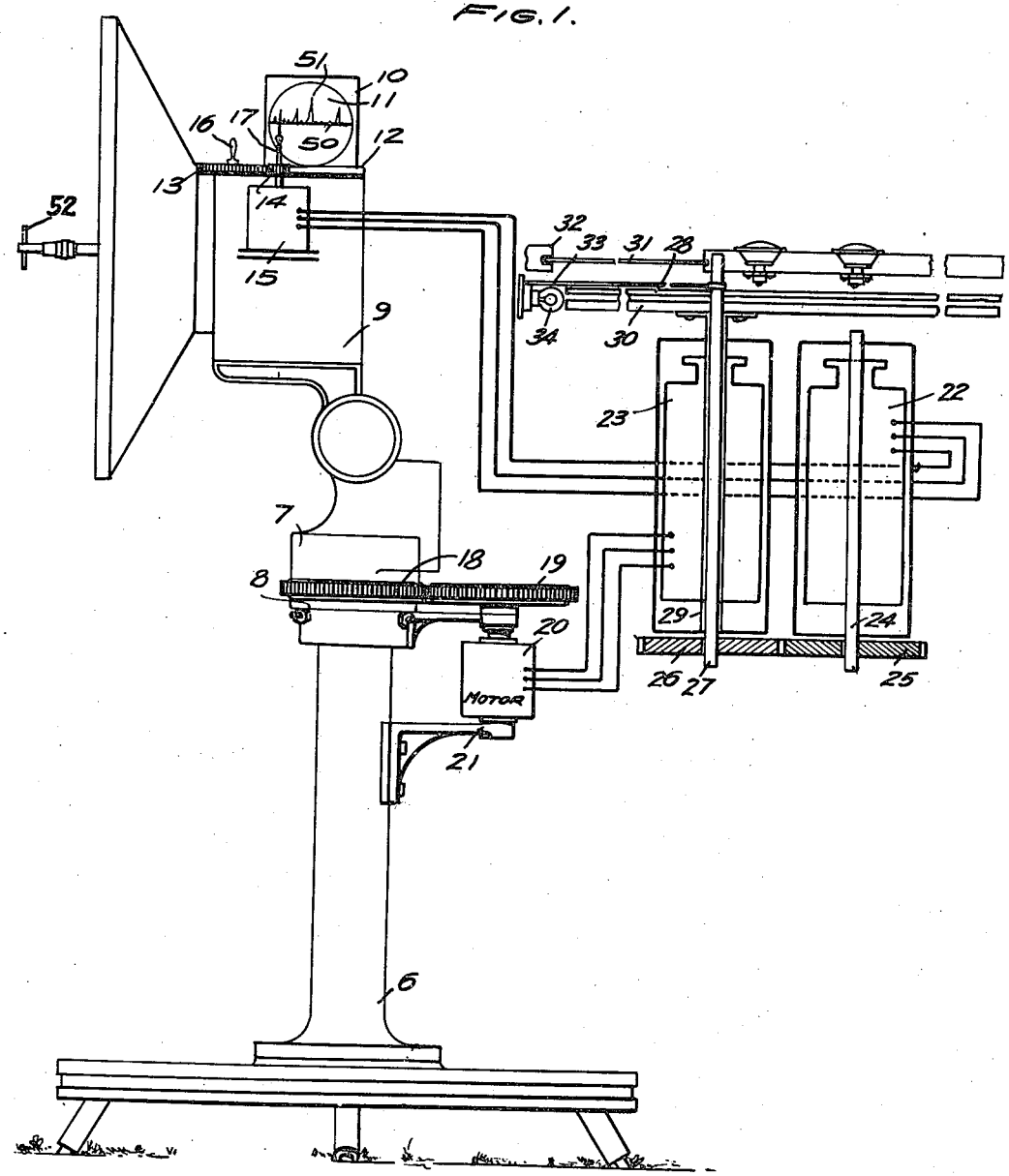

2,479,569

UNITED STATES PATENT OFFICE 2,479,569

MECHANICAL CONVERTER

Jonas Harschel, United States Army

Application November 26, 1943, Serial No. 511,898

6 Claims. (Cl. 343—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in devices for mechanically converting polar coordinates to rectangular coordinates.

In certain military operations objects are located by means of electronic devices, popularly called "radar" apparatus. The azimuth angle and distance of the object can be readily determined, thus locating the object in polar coordinates. It is often desired that the location of the object be known in rectangular coordinates so that it can be accurately plotted on a map. Heretofore, the conversion of polar coordinates to rectangular coordinates his required considerable time and involved human errors.

It is, therefore, an object of this invention to provide a device for mechanically and rapidly converting polar coordinates to rectangular coordinates, thus eliminating human errors and saving time.

A further object is the provision of a device for locating objects on a map in rectangular coordinates simultaneously with the location of the object in polar coordinates.

These and other objects are attained by the novel structure and arrangements of parts hereinafter described and illustrated in the accompanying drawings, forming a part hereof, and in which:

Fig. 1 is an elevation view of an apparatus embodying the invention.

Fig. 2 is a plan view of an element of the apparatus.

Fig. 3 is a plan view of a dial used in the apparatus.

Fig. 4 is a view showing the manner in which the location of an object is indicated in rectangular coordinates on the dial shown in Fig. 3.

Fig. 5 is an enlarged view of a detail of Fig. 3.

Referring to the drawings, the apparatus is shown to include an electronic device of the "radar" type for locating objects. This device has a pedestal 6 upon which a block 7 is rotatably mounted on ball bearings 8. The block 7 supports a casing 9 enclosing electronic equipment, and mounted on the casing 9 is an oscilloscope 10 having a face 11. The electronic equipment generates a very high frequency which is transmitted from antenna 52 to the object being located, and reflections from the object are received by the antenna and indicated on the face of the oscilloscope 10. The position of the peaks 51 along the line 50 of the face of the oscilloscope 10 indicates the distance away of objects located.

Mounted on the casing 9 directly below the oscilloscope is a channel 12 in which is slidably positioned a rack 13 in mesh with a pinion 14 fixed to the shaft of a Selsyn motor 15. The rack 13 is provided with an upstanding handle 16 by means of which the rack can be slid in the channel. Also projecting upwardly from the rack is a pointer 17, the tip of which is adjacent the center line of the face of the oscilloscope. The rack 13 is equal in length to the length of the center line 50, and is equal also to the length of the circumference of the pinion 14 so that the Selsyn motor 15 will make a complete revolution when the pointer completely traverses the center line of the oscilloscope.

Fixed to the block 7 is a gear 18 in mesh with a gear 19 fixed to the shaft of a Selsyn motor 20. The gears 18 and 19 are of the same diameter so that the Selsyn motor 20 will make a complete revolution when the block 7 makes a complete revolution. The Selsyn motor 20 is supported by a bracket 21 attached to the pedestal 6.

Selsyn motor 15 is connected by suitable wires to a cooperating Selsyn motor 22 having a shaft 24 to which is fixed a gear 25 in mesh with a similar gear 26 fixed to a shaft 27 having fixed to the upper end thereof a transparent disc 28. Shaft 27 passes through a hollow shaft 29 of a Selsyn motor 23, which is connected by suitable wiring to the Selsyn motor 20. Fixed to the upper end of hollow shaft 29 is a disc 30 having thereon a map divided into a plurality of squares to provide rectangular coordinates. The motors 22 and 23 are mounted in a casing 32 provided with a transparent window 31. A fixed wire 33 extends from the center of the discs to the casing, and the discs are illuminated by a lamp 34. Marked on the transparent disc 28 is a spiral curve 35.

In operation, the two discs 28 and 30 are respectively driven independently by the Selsyn motors 22 and 23. The coordinate converting apparatus may be located adjacent the azimuth and range detecting device, or it may be located at a remote point. In locating an object, the azimuth and range detector is rotated until a maximum signal is received. This signal will be indicated by the height of the peaks 51 on the face of the oscilloscope 10. As the azimuth and range detecting device is rotated in a horizontal plane, the Selsyn motor 20 follows such rotary movements exactly as the gears 18 and 19 are identical, having the same diameter and the same number of teeth. The movements of Selsyn motor 20 are transmitted to Selsyn motor 23 to rotate disc 30, which accordingly will also follow exactly the angular movements of the azimuth detecting device. Disc 30 carries a map of the terrain being considered, the map being divided into a plurality of squares.

When the maximum peak appears on the oscilloscope, the rack 13 is moved by means of handle 16 to bring the pointer 17 over the maximum peak 51. Since the rack has the same length as the circumference of pinion 14, the Selysn motor 15 will be rotated in accordance with the movements of the rack 13. A complete traverse of the center line 50 of the face of the oscilloscope will cause the motor 15 to rotate one revolution. The movements of motor 15 are transmitted to Selsyn motor 22, which rotates transparent disc 28. A spiral curve 35 is marked on disc 28, and the intersection of the spiral 35 with the hairline or wire 33 will indicate on the map 30 the location of the target in rectangular coordinates upon which the azimuth and range detecting device has been directed. The spiral 35 is so drawn that the distance of each point thereof from the center of the spiral is proportional to the angular separation of such point from the tangent to the beginning of the spiral.

Having described my invention, what I claim is:

1. A device for mechanically converting polar coordinates to rectangular coordinates, comprising a transparent disc having a map thereon divided into a plurality of squares, a second transparent disc having a spiral curve marked thereon, said second-disc being concentric with and positioned below the transparent disc, a fixed wire extending from the center of the discs, a detecting device for determining the azimuth and range of an object, and means controlled by the movements of said device to rotate the two discs.

2. In a device for converting mechanically polar coordinates to rectangular coordinates, a disc having thereon a map divided into a plurality of squares, a second disc of transparent material having a spiral curve marked thereon, said discs being concentric, a fixed wire radiating from the center of the discs, and means to rotate the discs.

3. In a device for mechanically converting polar coordinates to rectangular coordinates, a disc having a map thereon provided with rectangular sections for identifying position, a second disc coaxial with said first disc having a spiral curve inscribed thereon for indicating range, a fixed indicator wire extending radially from the axis, a Selsyn motor for rotating each disc, and means dependent upon the movements of an azimuth and range detecting device for controlling the Selsyn motors.

4. In combination, an electronic apparatus for determining the azimuth and range of an object, a Selsyn motor mounted to follow the azimuth movements of the apparatus, a second Selsyn motor mounted to be rotated through an angle dependent upon the range of the object, a remotely rotatably mounted disc having a map thereon divided into rectangular coordinates, a disc of transparent material concentric with the map disc and having a spiral curve marked thereon, a fixed wire extending radially from the center of the discs, and means controlled by the operation of the Selsyn motors to rotate said discs through definite angles dependent upon the azimuth and range of the object being located.

5. In a device for converting mechanically polar coordinates to rectangular coordinates, a disc having a plurality of squares marked thereon, a member having a spiral curve marked thereon, said member and disc being rotatable about a common axis, a fixed member radiating from the axis of rotation, and means to rotate the first mentioned member and disc.

6. A device for converting the polar coordinates of an object to rectangular coordinates comprising, a disc having a map thereon provided with rectangular sections for identifying position, a second disc of transparent material coaxial with said first disc and having a spiral curve for indicating range inscribed thereon, a fixed indicator member extending radially from the common axis of said discs, means for rotating said first disc in accordance with the azimuth of the object, means for rotating said second disc in accordance with the range of the object, the object position in rectangular coordinates being given by the intersection of the indicator and spiral curve on said second disc.

JONAS HARSCHEL.

REFERENCES CITED

The following references are of record in the file of this patent:

UNITED STATES PATENTS

| Number | Name | Date |
|---|---|---|
| 1,889,026 | Warrick | Nov. 29, 1932 |
| 2,063,906 | Boch | Dec. 15, 1936 |
| 2,077,196 | Alexanderson | Apr. 13, 1937 |
| 2,357,131 | Putman | Aug. 29, 1944 |

FOREIGN PATENTS

| Number | Country | Date |
|---|---|---|
| 352,254 | Great Britain | July 9, 1931 |